United States Patent
Freidkes et al.

(10) Patent No.: US 11,674,872 B2
(45) Date of Patent: Jun. 13, 2023

(54) CALIBRATION TECHNIQUE OF WALL SHEAR STRESS SENSORS USING OSCILLATING PLATE

(71) Applicant: UNIVERSITY OF FLORIDA RESEARCH FOUNDATION, INCORPORATED, Gainesville, FL (US)

(72) Inventors: Brett R. Freidkes, Gainesville, FL (US); Mark Sheplak, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 438 days.

(21) Appl. No.: 16/924,808

(22) Filed: Jul. 9, 2020

(65) Prior Publication Data

US 2021/0018414 A1    Jan. 21, 2021

Related U.S. Application Data

(60) Provisional application No. 62/874,045, filed on Jul. 15, 2019.

(51) Int. Cl.
*G01N 3/62* (2006.01)
*G01N 3/24* (2006.01)

(52) U.S. Cl.
CPC .............. *G01N 3/62* (2013.01); *G01N 3/24* (2013.01); *G01N 2203/0025* (2013.01); *G01N 2203/04* (2013.01)

(58) Field of Classification Search
CPC .... G01N 3/62; G01N 3/24; G01N 2203/0025; G01N 2203/04; G01L 25/00
USPC .......................................................... 73/841
See application file for complete search history.

(56) References Cited

U.S. PATENT DOCUMENTS

| | | | | |
|---|---|---|---|---|
| 5,199,298 A | * | 4/1993 | Ng | G01N 11/00 73/147 |
| 8,508,229 B2 | * | 8/2013 | Ehman | G01R 33/56358 324/318 |
| 2007/0034014 A1 | * | 2/2007 | Armstrong | G01N 13/02 73/841 |

(Continued)

FOREIGN PATENT DOCUMENTS

JP    02159531    *    6/1990

*Primary Examiner* — Octavia Davis Hollington
(74) *Attorney, Agent, or Firm* — Alston & Bird LLP

(57) ABSTRACT

Disclosed are a system and methods for calibrating wall shear stress sensors. The system includes an oscillating plate coupled to an actuator and mounted on a rolling elements, and one or more sensors coupled to a height adjusting device. The system can further comprise a height control rod coupled to a height control base and a sensor holder configured to house the one or more sensors and supported on a connector, the connector configured to be rotatably disposed about the height control rod. The system can be calibrated by causing the actuator to oscillate the oscillating plate at a frequency, sensing, using the one or more sensors, shear stress at a wall, the shear stress at the wall being associated with a velocity field, and determining a theoretical wall shear stress based on fluid properties, the frequency, and the height of the one or more sensors above the oscillating plate.

20 Claims, 11 Drawing Sheets

(56) References Cited

U.S. PATENT DOCUMENTS

2009/0266138 A1* 10/2009 McDearmon ........... G01L 25/00
                                                    73/1.15
2017/0120249 A1*  5/2017 Umbanhowar ......... C08B 15/05

* cited by examiner

CALIBRATION TECHNIQUE OF WALL SHEAR STRESS SENSORS USING OSCILLATING PLATE

CROSS-REFERENCE TO RELATED APPLICATIONS

This application claims priority to, and the benefit of, U.S. Provisional Patent Application Ser. No. 62/874,045, filed Jul. 15, 2019, entitled "Calibration Technique Of Wall Shear Stress Sensors Using Oscillating Plate," the entire disclosures of which are hereby incorporated herein by reference in their entireties for all purposes.

GOVERNMENT SUPPORT STATEMENT

This invention was made with government support under 80NSSC19C0097 awarded by the National Aeronautics and Space Administration (NASA). The government has certain rights in the invention.

BACKGROUND

Wall shear stress sensors are often used to measure stresses, such as wall shear stresses, at a boundary between a surface and a fluid traveling across the surface. To understand the relation between an input wall shear stress and an output signal of such sensors, a calibration must typically be performed.

BRIEF SUMMARY

In general, embodiments of the present invention provide methods, apparatuses, and systems for calibrating a wall shear stress sensor. In some embodiments, the system can comprise an oscillating plate coupled to an actuator and mounted on a device that enables smooth sliding movement of the oscillating plate without imparting substantial frictional force, such as one or more rolling elements, and one or more sensors coupled to a height adjusting device. In some embodiments, the height adjusting device can be configured to adjust a height of the one or more sensors above the oscillating plate. In some embodiments, the system can further comprise a height control rod coupled to a height control base and a sensor holder configured to house the one or more sensors and supported on a connector, the connector configured to be rotatably disposed about the height control rod. For instance, in some embodiments, the height control rod can comprise a thread disposed about a center shaft such that the connector can be mounted onto the height control rod at a particular height above the oscillating plate by coupling the connector to the height control rod and moving the connector along the thread.

In some embodiments, the actuator comprises one or more of a horizontal shaker, a waveform generator, a horizontal displacement device, and an electrodynamic device. In some embodiments, the sensor holder can comprise an annular rod that holds a cylindrical tubing configured to house the one or more sensors. In some embodiments, at least one proximity sensor can be supported on at least one of the one or more prongs extending from the sensor holder. In some embodiments, the proximity sensors can comprise one of a Hall Effect sensor and a laser-based device. In other embodiments, other sensors or devices may comprise the proximity sensors. In some embodiments, the one or more sensors can be configured to confirm that a sensor position relative to a position of the oscillating plate is constant during use of the system.

In some embodiments, a system such as above can be calibrated by at least causing the actuator to oscillate the oscillating plate at a frequency, sensing, using the one or more sensors, shear stress at a wall, the shear stress at the wall being associated with a velocity field, and determining a theoretical wall shear stress based on fluid properties, the frequency, and the height of the one or more sensors above the oscillating plate.

As such, an associated method for calibrating a wall shear stress sensor can comprise providing one or more sensors a height above an oscillating plate, the oscillating plate disposed on a rolling element and coupled to an actuator, the actuator configured to cause the oscillating plate to oscillate relative to the one or more sensors, causing the actuator to oscillate the oscillating plate at a frequency, sensing, using the one or more sensors, shear stress at a wall, the shear stress at the wall being associated with a velocity field, and determining a theoretical wall shear stress based on fluid properties, the frequency, and the height of the one or more sensors above the oscillating plate.

In some embodiments, a system can be provided that comprises an oscillating plate coupled to an actuator and mounted on a reduced friction sliding device, wherein the oscillating plate is configured to generate a velocity field transmitted towards the one or more sensors; and one or more sensors disposed a distance above the oscillating plate, at least one of the oscillating plate and the one or more sensors configured to be moveable to achieve the distance of the one or more sensors above the oscillating plate, the one or more sensors being configured to measure shear stress at a wall, the shear stress at the wall being associated with the velocity field. In some embodiments, the system can further comprise a height control rod coupled to a height control base; and a sensor holder configured to house the one or more sensors and supported on a connector, the connector configured to be rotatably disposed about the height control rod. In some embodiments, the actuator comprises one or more of a horizontal shaker, a waveform generator, a horizontal displacement device, and an electrodynamic device. In some embodiments, the sensor holder comprises an annular rod that holds a cylindrical tubing configured to house the one or more sensors. In some embodiments, at least one proximity sensor can be supported on at least one of the one or more prongs extending from the sensor holder. In some embodiments, the one or more sensors can be configured to confirm that a sensor position relative to a position of the oscillating plate is constant during use of the system. In some embodiments, the one or more sensors can be calibrated using the system by at least: causing the actuator to oscillate the oscillating plate at a frequency sufficient to generate the velocity field; sensing, using the one or more sensors, shear stress at a wall, the shear stress at the wall being associated with the velocity field; and determining a theoretical wall shear stress based on the velocity field, fluid properties, the frequency of oscillation of the oscillating plate, and the height of the one or more sensors above the oscillating plate. In some embodiments, the fluid properties can comprise fluid temperature.

In some embodiments, a method can be carried out that comprises providing one or more sensors a height above an oscillating plate, the oscillating plate being disposed on a reduced friction sliding device and coupled to an actuator, the actuator being configured to cause the oscillating plate to oscillate relative to the one or more sensors; causing the actuator to oscillate the oscillating plate at a frequency sufficient to generate a velocity field towards the one or more sensors; sensing, using the one or more sensors, shear stress at a wall, the shear stress at the wall being associated with the velocity field; and determining a theoretical wall shear stress based on the velocity field, fluid properties, the frequency at which the oscillating plate is oscillating, and the height of the one or more sensors above the oscillating plate. In some embodiments, the fluid properties can comprise fluid temperature. In some embodiments, the one or more sensors are coupled to a sensor holder and supported on a connector, the connector being configured to be moveably coupled to a height control rod supported on a height control base. In some embodiments, the sensor holder comprises an annular rod that holds a cylindrical tubing configured to house the one or more sensors. In some embodiments, at least one proximity sensor can be supported on at least one of the one or more prongs extending from the sensor holder. In some embodiments, the actuator comprises one or more of a horizontal shaker, a waveform generator, a horizontal displacement device, and an electrodynamic device. In some embodiments, the one or more sensors can be configured to confirm that a sensor position relative to a position of the oscillating plate is constant during use of the wall shear stress sensor.

In other embodiments, a method can be carried out that comprises causing oscillation of an oscillating plate at a frequency and an amplitude, the oscillating plate being disposed a relative distance from one or more sensors, wherein oscillating the oscillating plate at the frequency and the amplitude is sufficient to generate a velocity field that is transmitted towards the one or more sensors; sensing, using the one or more sensors, shear stress at a wall, the shear stress at the wall being associated with the velocity field; and determining a theoretical wall shear stress based on the velocity field, the frequency and amplitude of oscillation of the oscillating plate, and the relative distance of the one or more sensors from the oscillating plate. In some embodiments, the method can further comprise moving one or more of the oscillating plate and the one or more sensors to achieve one or more adjusted relative distances between the oscillating plate and the one or more sensors such that the oscillating plate is caused to generate one or more adjusted velocity fields when oscillating at the frequency; sensing, using the one or more sensors, shear stress at the wall associated with the one or more adjusted velocity fields; determining a line of best fit through the velocity field and the one or more adjusted velocity fields; and determining an adjusted theoretical wall shear stress based on the velocity field, the one or more adjusted velocity fields, the frequency and amplitude of oscillation of the oscillating plate, the relative distance of the one or more sensors from the oscillating plate, the one or more adjusted relative distances of the one or more sensors from the oscillating plate, and the line of best fit through the velocity field and the one or more adjusted velocity fields. In some embodiments, the method can further comprise oscillating the oscillating plate at one or more adjusted frequencies and one or more adjusted amplitudes such that the oscillating plate is caused to generate one or more adjusted velocity fields when the one or more sensors are disposed the relative distance from the oscillating plate; sensing, using the one or more sensors, shear stress at a wall, the shear stress at the wall being associated with the one or more adjusted velocity fields; determining a line of best fit through the velocity field and the one or more adjusted velocity fields; and determining an adjusted theoretical wall shear stress based on the velocity field, the one or more adjusted velocity fields, the frequency and amplitude of oscillation of the oscillating plate, the one or more adjusted frequencies of oscillation of the oscillating plate, the one or more adjusted amplitudes of oscillation of the oscillating plate, the relative distance of the one or more sensors from the oscillating plate, and the line of best fit through the velocity field and the one or more adjusted velocity fields. In some embodiments, the method can further comprise determining one or more fluid properties of a fluid disposed between the oscillating plate and the one or more sensors; and determining the theoretical wall shear stress based on the velocity field, the frequency and amplitude of oscillation of the oscillating plate, the relative distance of the one or more sensors from the oscillating plate, and the one or more fluid properties of the fluid disposed between the oscillating plate and the one or more sensors. In some embodiments, the one or more fluid properties can comprise temperature, and the fluid can comprise air.

BRIEF DESCRIPTION OF THE DRAWINGS

Figure 1:
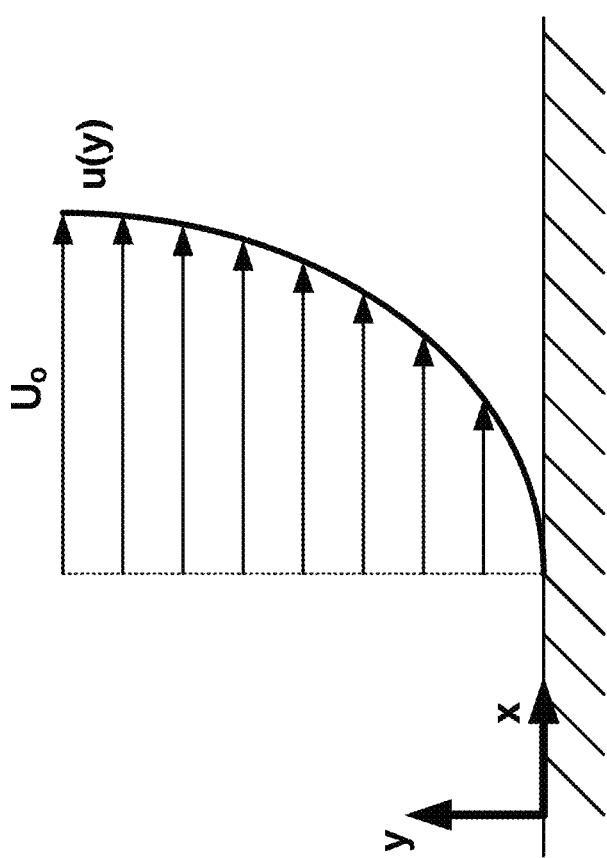
Figure 2A:
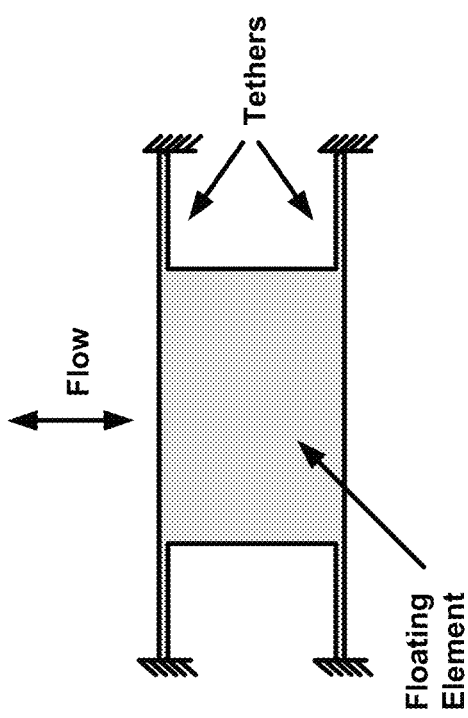
Figure 2B:
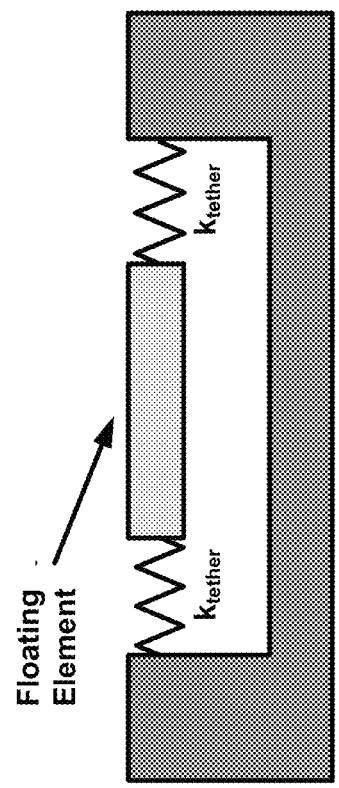
Figure 3:
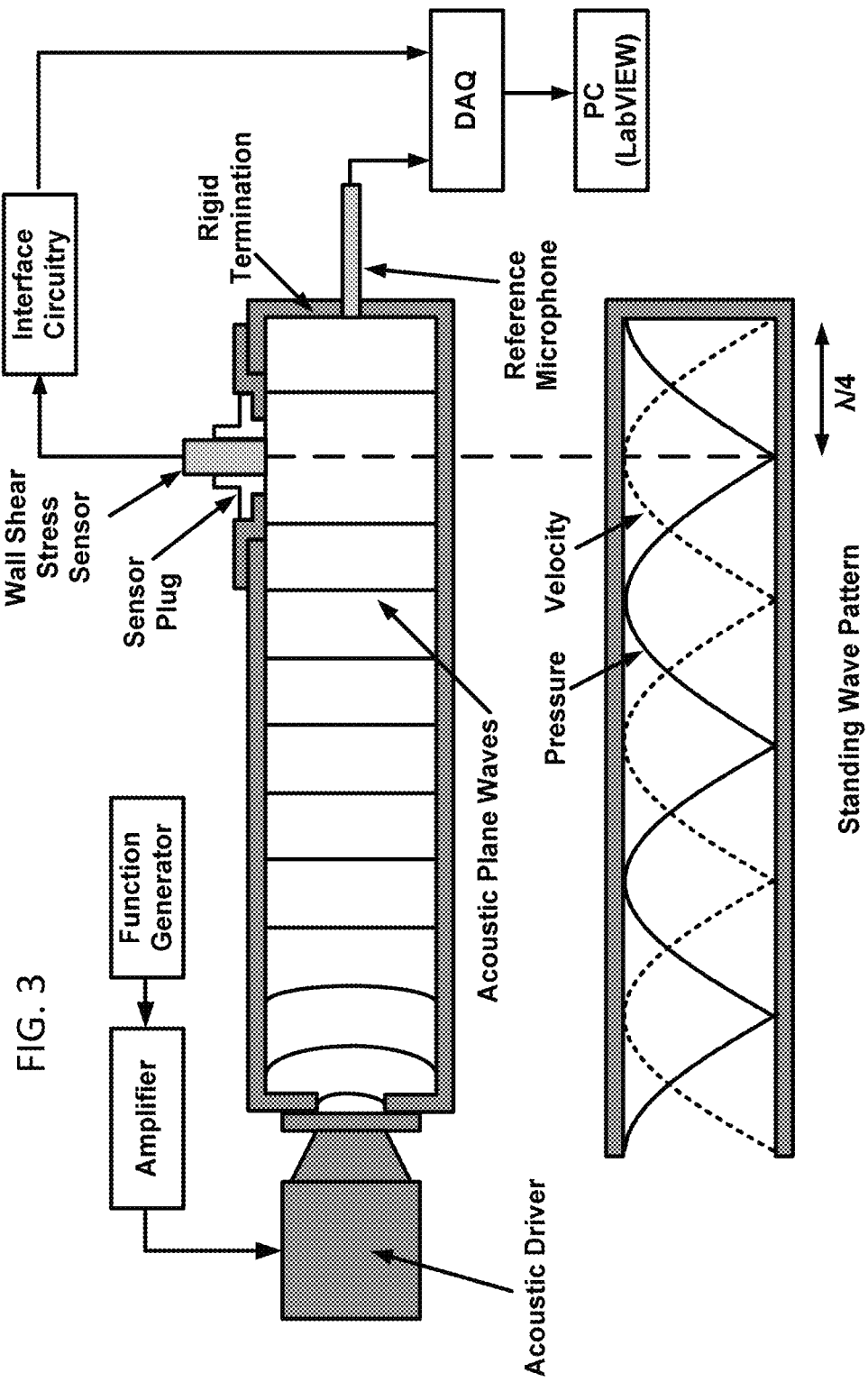
Figure 4:
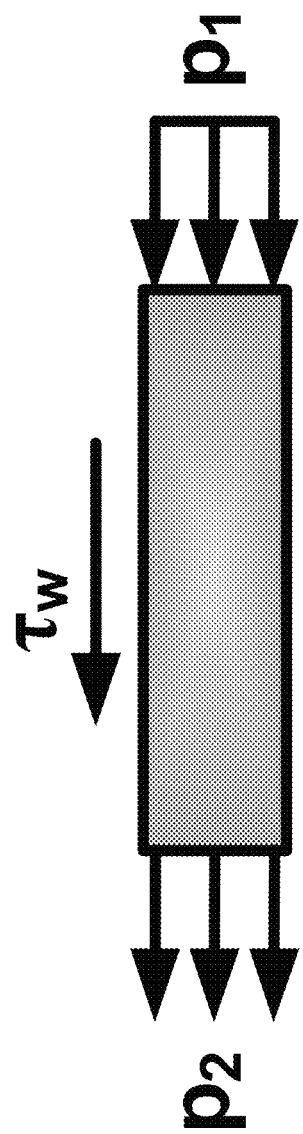
Figure 5:
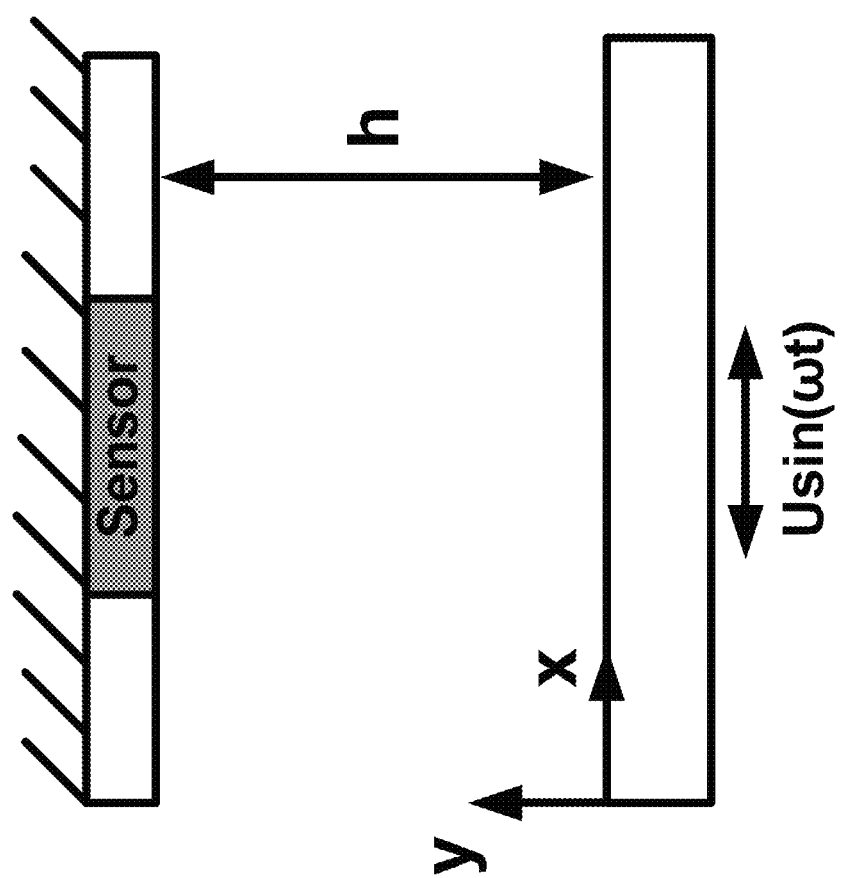
Figure 6:
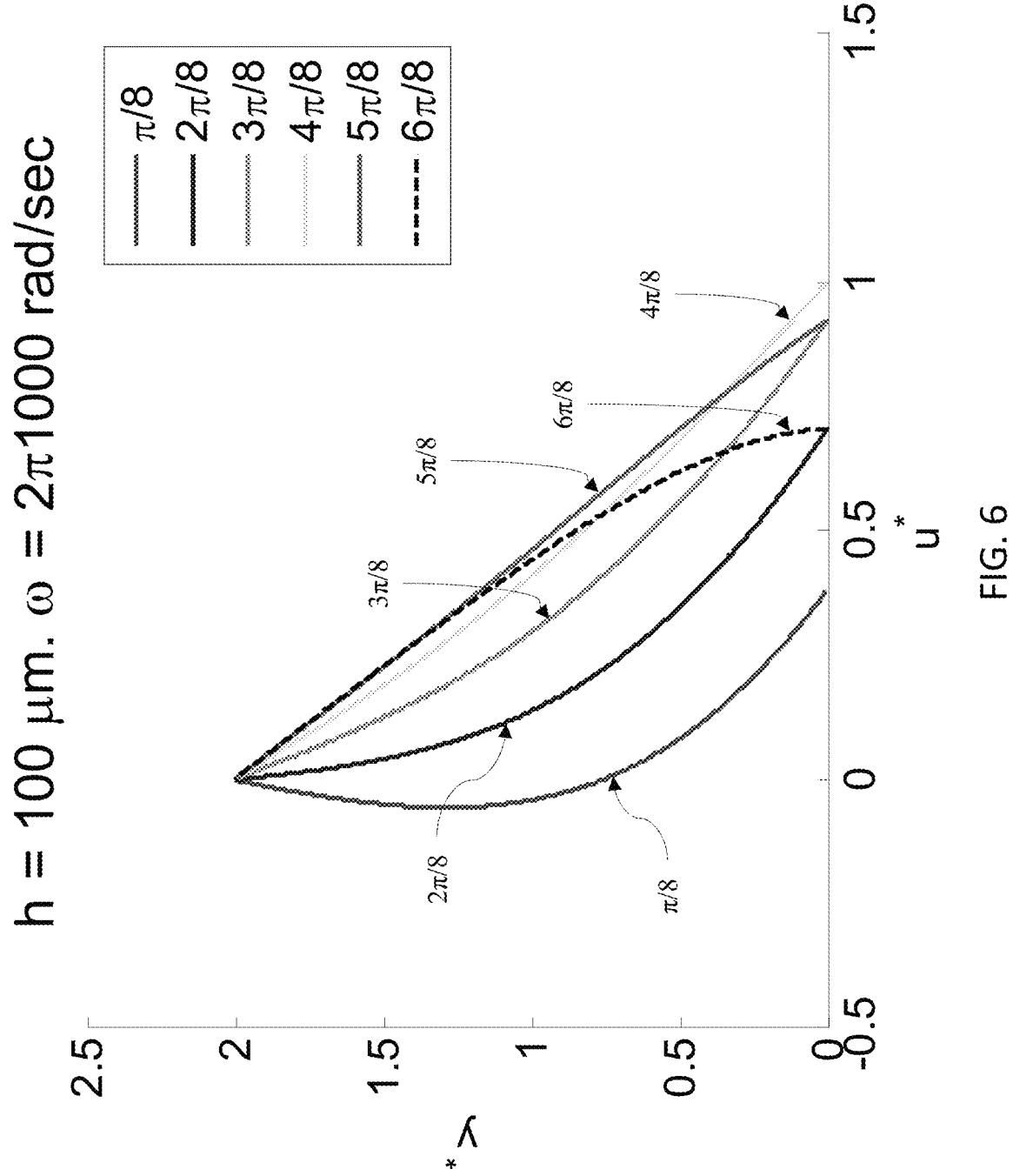
Figure 7:
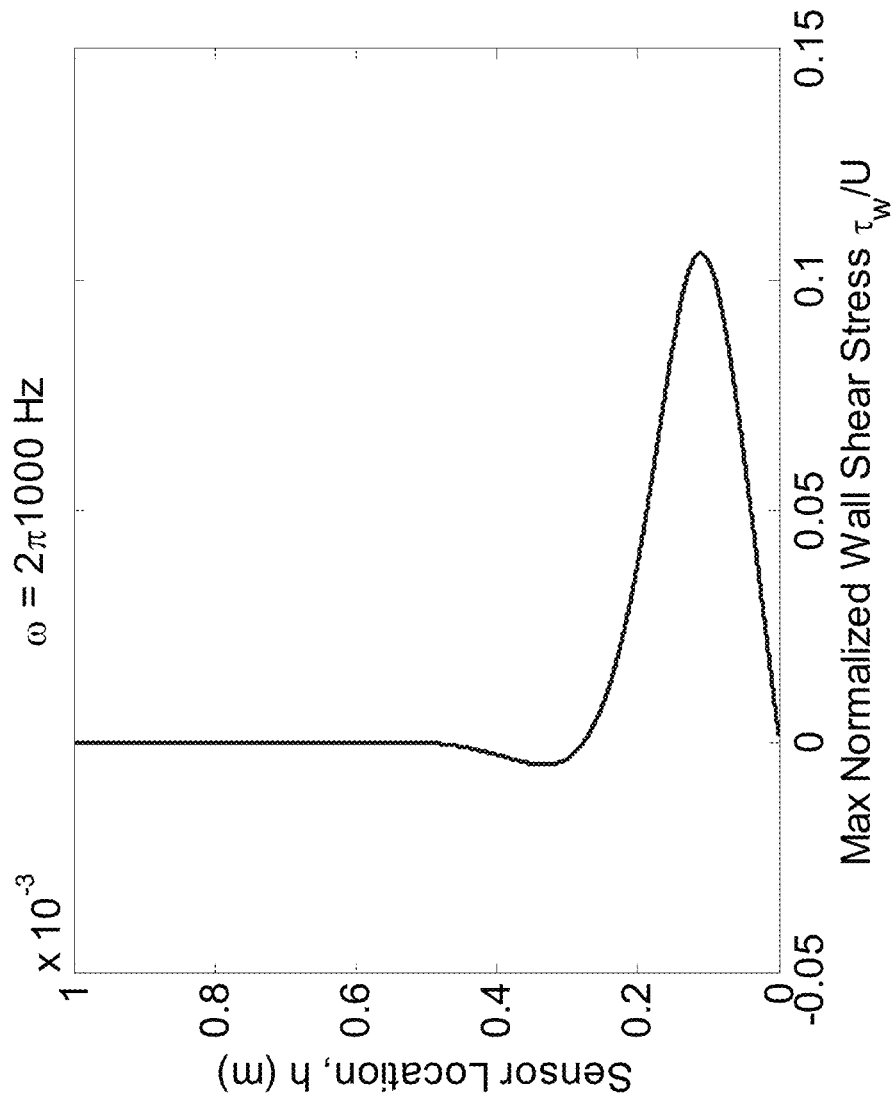
Figure 8:
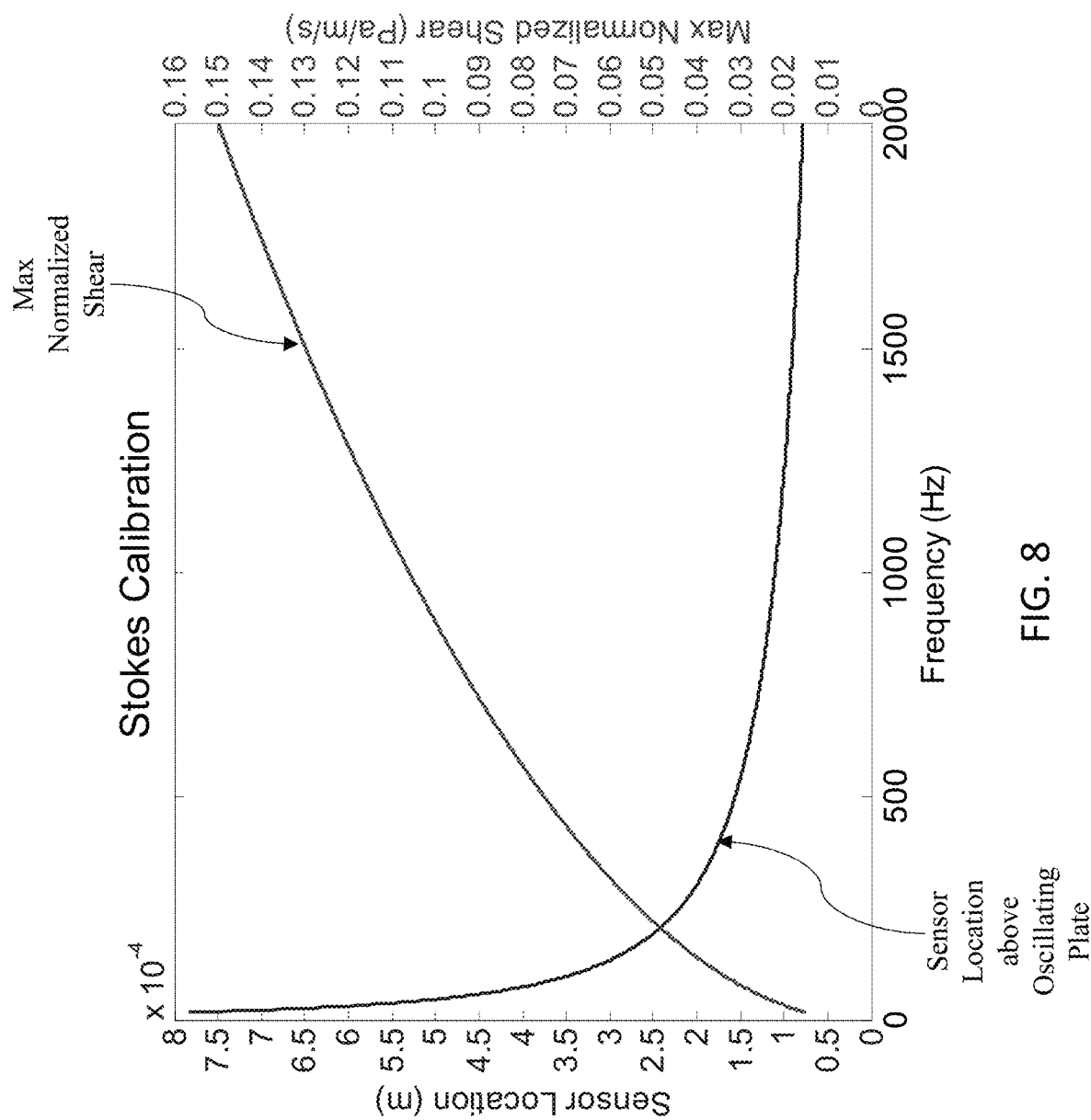
Figure 9:
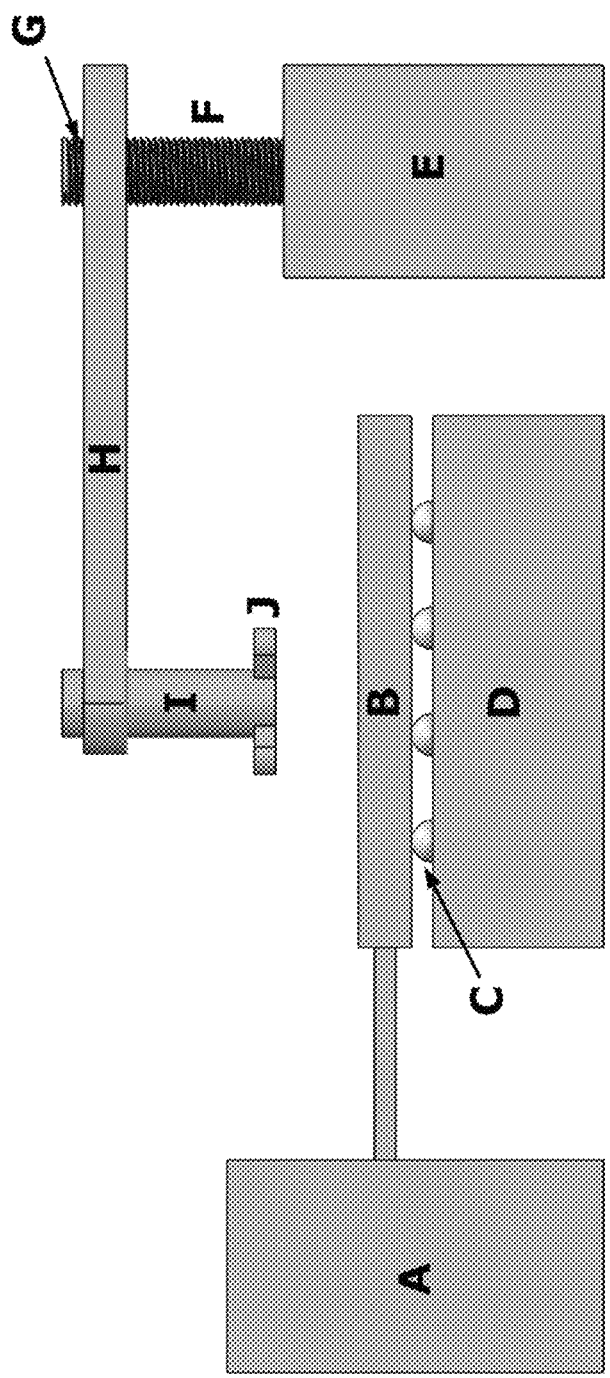
Figure 10:
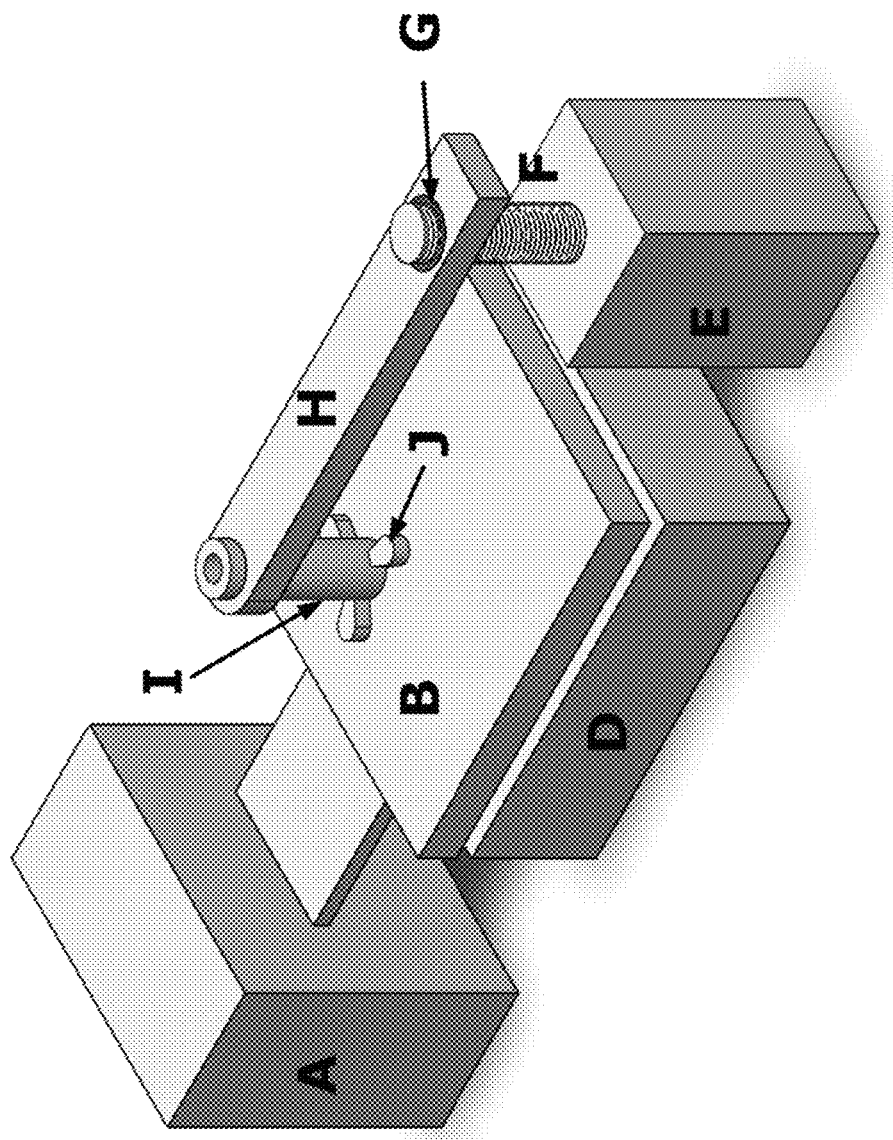
Figure 11:
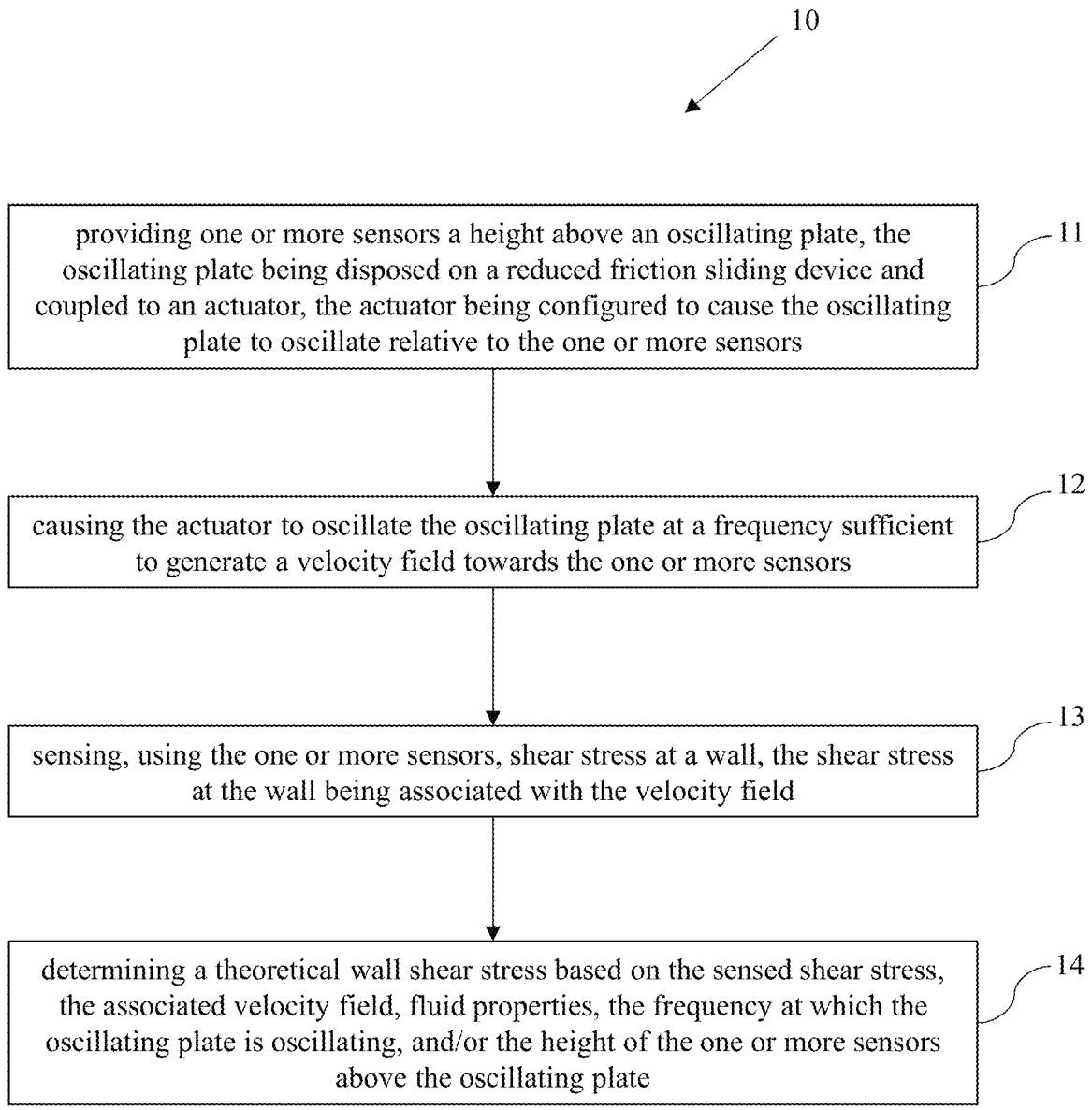

Having thus described the invention in general terms, reference will now be made to the accompanying drawings, which are not necessarily drawn to scale, and wherein:

FIG. 1 is a graphical illustration of a fluid (u(y)) moving left to right with a freestream velocity, $U_0$, relative to a wall (hashed area below the X axis) for which the fluid particles near the wall are affected by the presence of the wall, in accordance with some embodiments disclosed herein;

FIG. 2A provides a top view of a schematic for a floating element device, supported by four tethers, and configured to move in one direction or multiple directions in order to sense the wall shear stress exerted by a fluid flowing past a wall or other surface, in accordance with some embodiments disclosed herein;

FIG. 2B provides a side view of the schematic for the floating element device illustrated in FIG. 2A;

FIG. 3 illustrates an example calibration technique for wall shear stress sensors in which an acoustic wave is used to calibrate a wall shear stress sensor using theoretical expressions derived from Navier-Stokes equations in a rigid termination device, the wall shear stress sensor located at a pressure node, in accordance with some embodiments disclosed herein;

FIG. 4 provides a side view of a floating element illustrated with pressure from an acoustic plane wave during calibration acting on the sides of the floating element; this pressure on the sides of the floating element is typically misrepresented as incident wall shear stress due to the use of conventional calibration technique;

FIG. 5 illustrates a calibration approach for a wall shear stress sensor using an oscillating plate with the bottom portion being the oscillating plate and the top portion being a second, non-moving plate comprising a wall shear stress sensor positioned a height h above the oscillating plate, in accordance with some embodiments disclosed herein;

FIG. 6 is a graphical representation of the velocity field at different nondimensionalized times t* for which the velocity is always zero at the sensor location the sensor height being 100 micrometers and the oscillation frequency being 1,000 Hz, in accordance with some embodiments disclosed herein;

FIG. 7 is a graphical representation of maximum normalized wall shear stress as a function of sensor distance from the wall, in accordance with some embodiments disclosed herein;

FIG. 8 is a graphical representation, for a given frequency, of the optimal sensor height and corresponding maximum normalized wall shear stress, in accordance with some embodiments disclosed herein;

FIG. 9 is a side view of a schematic for a wall shear stress sensor calibration system, in accordance with some embodiments disclosed herein;

FIG. 10 is a perspective view of a schematic for a wall shear stress sensor calibration system, in accordance with some embodiments disclosed herein; and FIG. 11 is a flow diagram illustrating an example method for calibrating wall shear stress sensors, in accordance with some embodiments disclosed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

Wall shear stress sensors are often used to measure stresses at a boundary between a surface and a fluid traveling across the surface. To understand the relation between an input wall shear stress and an output signal of such sensors, a calibration must be performed. Conventional approaches for calibrating wall shear stress sensors do not account for pressure effects or only work at zero pressure. Dynamic calibration not accounting for pressure effects results in incorrect transduction as incident wall shear stress, giving inaccurate calibration measurements. As such, there is an ongoing need for improved calibration techniques by minimizing or zeroing out pressure effects to accurately sense wall shear stresses.

As a fluid travels over a surface, it will impart a tangential stress to the boundary that is known as a wall shear stress. Shown in FIG. 1, the particles within a fluid travel with a certain speed over a surface. Due to the no-slip boundary condition, the fluid particles at the boundary must match the velocity of the boundary. In the example shown in FIG. 1, the boundary is not moving, e.g., the wall velocity is 0 m/s, so the fluid particles in contact with the boundary will also not move. In response, the fluid particles will exert a tangential stress to the surface that is known as a "wall shear stress." A streamwise mean velocity, U, or characteristic velocity scale, can be given based on Reynolds number (Re) where Re=UL/v, L being the length scale and v being the kinematic viscosity of the fluid, turbulence being inextricably linked with shear, e.g., wall shear.

Some conventional approaches for measuring wall shear stress can involve the use of a sensor with a floating element, as shown in FIG. 2. A floating element is a supported body (e.g., supported by tethers, cantilever, etc.) that can move in response to wall shear stress. The mechanical displacement of the floating element is transduced into an output (e.g., electrical output). Transduction mechanisms may include, but are not limited to, capacitive transduction, piezoelectric transduction, piezoresistive transduction, and optical transduction.

Mathematically, the wall shear stress, $\tau_w$, e.g., for a Newtonian fluid, is the product of the dynamic viscosity of the fluid, $\mu$, and the gradient of the velocity profile, u(y), at the wall (y=0), as shown in equation (1):

$$\tau_w = \mu \frac{\partial u(y)}{\partial y}\bigg|_{y=0} \qquad (1)$$

where $\mu$ is the fluid dynamic viscosity and y is the wall-normal coordinate. As such, in some embodiments, the wall shear stress, $\tau_w$, may therefore be a measure of tangential force exerted by an incoming flow on a wall and by integrating over the surface it is possible to determine the impact of that force on the aerodynamic actions on a body, e.g., a submerged body.

In fields such as aeronautic engineering, submarine design, and the like, where aerodynamics or hydrodynamics may result in inefficient transport, damage to materials and equipment, and/or the like, accuracy in measuring wall shear stress can be critical. The measurement of wall shear stress also has important implications in the understanding of fluid mechanics, e.g., turbulent boundary layers, flow separation, etc. Accurate sensing devices are necessary to experimentally determine wall shear stress values.

Turbulence quantities and mean velocity profiles are commonly scaled with the so-called friction velocity $$u_\tau = \sqrt{\frac{\tau_w}{\rho}},$$

$\rho$ being the fluid density, and therefore small errors in the determination of the friction may lead to wrong conclusions regarding the functional form and asymptotic behavior of the velocity profile, e.g., at very high Reynolds numbers. It is then possible to draw inaccurate conclusions about the nature of wall-bounded turbulent flows based on unreliable measurements of wall shear.

To understand the relation between the input wall shear stress and output signal of a sensor, a calibration must be performed. A dynamic calibration technique, e.g., one that is frequency dependent, involves the use of acoustic waves to generate a wall shear stress. Referring now to FIG. 3, acoustic plane waves propagate in a duct (known as a plane wave tube). Due to the rigid end wall, a standing wave pattern, where pressure and velocity are out of phase, is produced. The sensor is positioned one-quarter wavelength away from the rigid end wall, where velocity is maximum, and pressure is ideally zero. Without wishing to be bound by any particular theory, it may be important to position the sensor one-quarter wavelength away from the rigid end wall because pressure effects may be minimized to calibrate the sensor to pure wall shear stress.

This acoustic wave calibration is useful for wall shear stress calibrations. However, there are some issues that should be addressed. First, the fact that pressure is zero one-quarter wavelength away from the end wall may only be valid at that infinitesimal point. Since the sensor (typically on the order of millimeters) is not infinitesimal, pressure will act on both sides of the element, as shown in FIG. 4. If the pressure gradient over the surface of the device is not zero (which is the case for the calibration), the sensor will move. This motion is incorrectly transduced as an incident wall shear stress, giving inaccurate calibration measurements.

Additionally, the frequencies that may be tested are fixed based on the manufacturing of the plane wave tube. Without wishing to be bound by any particular theory, this may be due to the fixed position of the quarter-wavelength spot where the sensor is positioned.

Disclosed herein are novel calibration techniques and associated systems and devices that allow for multiple frequency testing and eliminates the impact of pressure gradients.

One of the most common solutions to the Navier-Stokes equations is that of the oscillating plate. At y=0, a plate is oscillating back and forth at a frequency, w. Due to the motion of the plate, a velocity field that is dependent on the frequency and distance away from the plate is generated. In most textbooks, the problem is derived assuming that the plate is oscillating back and forth in an open space, e.g., there is nothing above it (besides the air itself).

In some embodiments, a plate may be oscillating with nothing above it. However, in other embodiments, such as described herein with regard to the described calibration approach, instead of having the plate oscillating with nothing above it, a sensor can be situated a distance h above, as shown in FIG. 5.

Discussed further herein, without wishing to be bound by any particular theory, is one possible mathematical theory for a Stokes Oscillating Plate calibration approach. The boundary conditions of this problem are as follows:

$$u(y=0) = U\sin(\omega t) = \operatorname{Im}(Ue^{j\omega t})$$

$$u(y=h) = 0$$

In the above expression, Im represents the "imaginary component of" the expression within the parentheses.

The assumptions for this particular application of the Navier-Stokes equation can include:
1. Two-dimensional (ignoring any variations into the page, e.g., in the z-direction)
2. Unidirectional (vertical velocity component is zero)
3. No pressure gradients
4. Neglecting body forces
5. Incompressible Based upon at least these assumptions, some of the terms from the Navier-Stokes equations may be neglected, terms marked below with diagonal arrows. Numerals above the diagonal arrows refer to the assumption from above which is used to neglect the marked term The Navier-Stokes equations can comprise a continuity equation (e.g., assuming incompressible flow), according to:

$$\frac{\partial u}{\partial x} + \cancel{\frac{\partial v}{\partial y}}^{2} = 0 \qquad \frac{\partial u}{\partial x} = 0$$

In some embodiments, the Navier-Stokes equations can comprise a momentum equation, such as a Navier-Stokes momentum equation, a Cauchy momentum equation, variations of the same, and/or the like. For instance, an X-Momentum equation can be such as in equation (2):

$$\frac{\partial u}{\partial t} + u\cancel{\frac{\partial u}{\partial x}}^{2} + v\cancel{\frac{\partial u}{\partial y}}^{2} = -\frac{1}{\rho}\cancel{\frac{\partial p}{\partial x}}^{3} + v\left(\cancel{\frac{\partial^2 u}{\partial x^2}}^{2} + \frac{\partial^2 u}{\partial y^2}\right) \quad (2)$$

$$\frac{\partial u}{\partial t} = v\frac{\partial^2 u}{\partial^2 y}$$

In some embodiments, equation (2) is a differential equation that needs to be solved with the given boundary conditions to find the appropriate velocity field. In this equation, u is the x-direction velocity, t is time, v is the kinematic viscosity of the fluid, and y is the distance above the oscillating plate. With the velocity field, a theoretical wall shear stress is ultimately found.

In some embodiments, such Navier-Stokes equations are solvable using complex exponentials, such as:

$$u(y) = \operatorname{Im}(Ue^{j\omega t}g(y))$$

In some embodiments, for this equation, U is the velocity of the plate and the imaginary part of the complex exponential is sine, such that y=0, u(0) is the velocity of the plate. The g(y) term compensates for the change in velocity as a function of distance above the plate. The following expressions can be plugged into the reduced Navier-Stokes equation, such as in equation (2).

$$\frac{\partial u}{\partial t} = Uj\omega e^{j\omega t}g(y)$$

$$\frac{\partial u}{\partial y} = Ue^{j\omega t}g'(y)$$

$$\frac{\partial^2 u}{\partial y^2} = Ue^{j\omega t}g''(y)$$

In some embodiments, plugging these expressions into the reduced Navier-Stokes equation shown in (2) results in:

$$\frac{\partial u}{\partial t} = v\frac{\partial^2 u}{\partial^2 y}$$

$$Uj\omega e^{j\omega t}g = vUe^{j\omega t}g''$$

$$j\omega g = vg''$$

$$g'' - \frac{j\omega}{v}g = 0$$

To solve this differential equation, an exponential solution of $g = e^{\lambda t}$ is assumed.

Substituting g and its derivatives into the equation results in:

$$\lambda^2 - \frac{j\omega}{v} = 0$$

$$\lambda = \pm\sqrt{\frac{j\omega}{v}}$$

Using the identity that $$\sqrt{j} = \frac{1+j}{\sqrt{2}}$$

$$\lambda = \pm\sqrt{\frac{\omega}{2\nu}}(1+j)$$

$$g = C_1 e^{\sqrt{\frac{\omega}{2\nu}}(1+j)y} + C_2 e^{-\sqrt{\frac{\omega}{2\nu}}(1+j)y}$$

In some embodiments, the velocity can then be given by:

$$u(y) = \text{Im}\left(Ue^{j\omega t}\left(C_1 e^{\sqrt{\frac{\omega}{2\nu}}(1+j)y} + C_2 e^{-\sqrt{\frac{\omega}{2\nu}}(1+j)y}\right)\right)$$

In some embodiments, such as for general cases, the variables can be nondimensionalized as follows:

$$u^* = \frac{u}{U}$$

$$t^* = \omega t$$

$$y^* = \frac{y}{\sqrt{\nu t}} = \frac{y}{\sqrt{\frac{\nu}{\omega}}} = \frac{y\sqrt{\omega}}{\sqrt{\nu}}$$

In some embodiments, substituting in the velocity field derived can result in equation (3) as below:

$$\boxed{u^* = \text{Im}\left(e^{jt^*}\left(C_1 e^{\sqrt{j}y^*} + C_2 e^{-\sqrt{j}y^*}\right)\right)} \quad (3)$$

In some embodiments, using the new boundary conditions, the unknown constants can be found. For instance, when y=0, which may be the same as y*=0, the velocity is the velocity of the plate, $u=Ue^{jt^*}(u^*=e^{jt^*})$, such as noted in equation (4) below:

$$e^{jt^*} = e^{jt^*}(C_1+C_2)$$

$$C_1 + C_2 = 1 \quad (4)$$

$$y = h\left(y^* = h\sqrt{\frac{\omega}{\nu}}\right),$$

In some embodiments, at the velocity can be 0 (so u* is zero), such as:

$$u^* = e^{jt^*}\left(C_1 e^{h\sqrt{\frac{j\omega}{\nu}}} + C_2 e^{-h\sqrt{\frac{j\omega}{\nu}}}\right) = 0$$

In some embodiments, a simplification of the above equation can result in equation (5):

$$\boxed{h^* = h\sqrt{\frac{j\omega}{\nu}}} \quad (5)$$

$$u^* = e^{jt^*}\left(C_1 e^{h^*} + C_2 e^{-h^*}\right) = 0$$

$$C_1 e^{h^*} + C_2 e^{-h^*} = 0$$

In some embodiments, equations (4) and (5) may be used to form a system of equations used to find the unknown constants. In some embodiments, these equations written in matrix notation may yield:

$$\begin{bmatrix} 1 & 1 \\ e^{h^*} & e^{-h^*} \end{bmatrix} \begin{Bmatrix} C_1 \\ C_2 \end{Bmatrix} = \begin{bmatrix} 1 \\ 0 \end{bmatrix}$$

As such, in some embodiments, solving the system can result in the following expressions for the constants:

$$\boxed{\begin{aligned} C_1 &= \frac{-e^{-h^*}}{2\sinh(h^*)} \\ C_2 &= \frac{e^{h^*}}{2\sinh(h^*)} \end{aligned}}$$

In some embodiments, these expressions can be plugged back into the velocity field derived in equation (3), such as in equation (6) below:

$$u^* = e^{jt^*}\left(C_1 e^{\sqrt{j}y^*} + C_2 e^{-\sqrt{j}y^*}\right) \quad (6)$$

$$u^* = e^{jt^*}\left(\frac{-e^{-h^*}}{2\sinh(h^*)}e^{\sqrt{j}y^*} + \frac{e^{h^*}}{2\sinh(h^*)}e^{-\sqrt{j}y^*}\right)$$

$$u^* = e^{jt^*}\left(\frac{-e^{-h^*}e^{\sqrt{j}y^*}}{2\sinh(h^*)} + \frac{e^{h^*}e^{-\sqrt{j}y^*}}{2\sinh(h^*)}\right) = e^{jt^*}\left(\frac{-e^{-h^*}e^{\sqrt{j}y^*} + e^{h^*}e^{-\sqrt{j}y^*}}{2\sinh(h^*)}\right)$$

$$u^* = e^{jt^*}\left(\frac{-e^{-h^*+\sqrt{j}y^*} + e^{h^*-\sqrt{j}y^*}}{2\sinh(h^*)}\right)$$

$$u^* = e^{jt^*}\left(\frac{e^{h^*-\sqrt{j}y^*} - e^{-h^*+\sqrt{j}y^*}}{2\sinh(h^*)}\right)$$

$$\boxed{u^* = \text{Im}\left(e^{jt^*}\left(\frac{\sinh(h^* - \sqrt{j}y^*)}{\sinh(h^*)}\right)\right)}$$

Referring now to FIG. 6, an example of the nondimensionalized velocity field for a sensor location (height, h) of 100 micrometers and an oscillation frequency of 1,000 Hz is illustrated for different times.

In some embodiments, the theoretical wall shear stress can be found by taking the derivative of the velocity field with respect to y, such as:

$$\tau = \mu\frac{\partial u}{\partial y} = \mu\frac{\partial(u^* U)}{\partial\left(y^*\sqrt{\frac{\nu}{\omega}}\right)} = \mu U\sqrt{\frac{\omega}{\nu}}\frac{\partial u^*}{\partial y^*}$$

In some embodiments, taking the derivative of equation (6) can result in:

$$\frac{\partial u^*}{\partial y^*} = \frac{e^{jt^*}}{\sinh(h^*)} \cosh(h^* - \sqrt{j}\, y^*)(-\sqrt{j})  \quad (5)$$

In some embodiments, plugging this resulting equation back into the shear stress expression can yield equation (7), such as:

$$\tau = \mu U \sqrt{\frac{\omega}{\nu}} \frac{\partial u^*}{\partial y^*} = -\mu U \sqrt{\frac{j\omega}{\nu}} \frac{\cosh(h^* - \sqrt{j}\, y^*)}{\sinh(h^*)} e^{jt^*} \quad (7)$$

$$\tau = -\mu U \sqrt{\frac{j\omega}{\nu}} \frac{\cosh(h^* - \sqrt{j}\, y^*)}{\sinh(h^*)} e^{jt^*}$$

In some embodiments, to find the wall shear stress based on these expressions, equation (7) can be set such that y=h or $$y^* = h\sqrt{\frac{\omega}{\nu}},$$

resulting in:

$$\tau_w = -\mu U \sqrt{\frac{j\omega}{\nu}} \frac{1}{\sinh(h^*)} e^{jt^*}$$

In some embodiments, normalizing by the plate velocity yields an expression for wall shear stress that is solely dependent on the fluid properties, frequency, and shear stress sensor location, such as equation (8):

$$\boxed{\frac{\tau_w}{U} = \mathrm{Im}\left(-\mu \sqrt{\frac{j\omega}{\nu}} \frac{1}{\sinh(h^*)} e^{jt^*}\right)} \quad (8)$$

In some embodiments, the expression for wall shear stress may be normalized additionally or alternatively by an acceleration of the plate.

In some embodiments, such as for a given frequency, the normalized wall shear stress can be found for multiple heights (sensor location). Referring now to FIG. 7, values for the maximum wall shear stress as a function of sensor distance from the wall are illustrated, ignoring the time dependency to find the maximum wall shear stress, for an example frequency of 1000 Hz. As illustrated, for this example frequency, a maximum normalized wall shear stress of 106 mPa/m/s may occur near 100 micrometers. However, it will be clear to those of skill in the art that other frequencies are possible and other maximum normalized wall shear stress values are therefore also possible. Likewise, the maximum normalized wall shear stress can be further normalized or alternatively normalized according to the velocity field.

In some embodiments, the calibration can be performed multiple times for different frequencies; as such the height that produces the maximum wall shear stress can and/or should be found for each case. In some embodiments, this can be analytically determined by taking the derivative of equation (8) with respect to h and setting it equal to zero, such as:

$$\frac{\tau_w}{U} = -\mu \sqrt{\frac{j\omega}{\nu}} \frac{1}{\sinh(h^*)} = -\mu \sqrt{\frac{j\omega}{\nu}} \frac{1}{\sinh\left(h\sqrt{\frac{j\omega}{\nu}}\right)}$$

$$\frac{\partial \left(\frac{\tau_w}{U}\right)}{\partial h} = -\mu \sqrt{\frac{j\omega}{\nu}} \frac{\sinh\left(h\sqrt{\frac{j\omega}{\nu}}\right)(0) - 1\left(\cosh\left(h\sqrt{\frac{j\omega}{\nu}}\right)\right)\sqrt{\frac{j\omega}{\nu}}}{\sinh^2\left(h\sqrt{\frac{j\omega}{\nu}}\right)}$$

$$\frac{\partial \left(\frac{\tau_w}{U}\right)}{\partial h} = \frac{\mu j\omega}{\nu} \frac{\cosh(h^*)}{\sinh^2(h^*)} = \frac{\mu j\omega}{\nu} \frac{1}{\tanh(h^*)\sinh(h^*)}$$

In some embodiments, converting these hyperbolic functions back to exponentials may yield:

$$\frac{\partial \left(\frac{\tau_w}{U}\right)}{\partial h} = \frac{\mu j\omega}{\nu} \frac{2(e^{h^*} + e^{-h^*})}{(e^{h^*} - e^{-h^*})^2}$$

Remembering that, at least in some embodiments:

$$e^{h^*} = e^{h\sqrt{\frac{j\omega}{\nu}}} = e^{h\sqrt{\frac{\omega}{\nu}}\sqrt{j}}$$

Using the identity in which $$\sqrt{j} = \frac{1+j}{\sqrt{2}}$$

may result in:

$$e^{h^*} = e^{h\sqrt{\frac{\omega}{\nu}}\sqrt{j}} = e^{h\sqrt{\frac{\omega}{2\nu}}(1+j)} = e^{h\sqrt{\frac{\omega}{2\nu}}} e^{\left(h\sqrt{\frac{\omega}{2\nu}}\right)j}$$

$$e^{h^*} = e^{h\sqrt{\frac{\omega}{2\nu}}}\left(\cos\left(h\sqrt{\frac{\omega}{2\nu}}\right) + j\sin\left(h\sqrt{\frac{\omega}{2\nu}}\right)\right)$$

$$e^{-h^*} = e^{-h\sqrt{\frac{\omega}{2\nu}}}\left(\cos\left(h\sqrt{\frac{\omega}{2\nu}}\right) - j\sin\left(h\sqrt{\frac{\omega}{2\nu}}\right)\right)$$

$$e^{h^*} + e^{-h^*} = e^{h\sqrt{\frac{\omega}{2\nu}}}\left(\cos\left(h\sqrt{\frac{\omega}{2\nu}}\right) + j\sin\left(h\sqrt{\frac{\omega}{2\nu}}\right)\right) +$$

$$e^{-h\sqrt{\frac{\omega}{2\nu}}}\left(\cos\left(h\sqrt{\frac{\omega}{2\nu}}\right) - j\sin\left(h\sqrt{\frac{\omega}{2\nu}}\right)\right)$$

$$e^{h^*} + e^{-h^*} = \left(e^{h\sqrt{\frac{\omega}{2\nu}}} + e^{-h\sqrt{\frac{\omega}{2\nu}}}\right)\cos\left(h\sqrt{\frac{\omega}{2\nu}}\right) +$$

$$j\left(e^{h\sqrt{\frac{\omega}{2\nu}}} - e^{-h\sqrt{\frac{\omega}{2\nu}}}\right)\sin\left(h\sqrt{\frac{\omega}{2\nu}}\right)$$

$$e^{h^*} - e^{-h^*} = e^{h\sqrt{\frac{\omega}{2\nu}}}\left(\cos\left(h\sqrt{\frac{\omega}{2\nu}}\right) + j\sin\left(h\sqrt{\frac{\omega}{2\nu}}\right)\right) -$$

$$e^{-h\sqrt{\frac{\omega}{2\nu}}}\left(\cos\left(h\sqrt{\frac{\omega}{2\nu}}\right) - j\sin\left(h\sqrt{\frac{\omega}{2\nu}}\right)\right)$$

-continued
$$e^{h^*} - e^{-h^*} = \left(e^{h\sqrt{\frac{\omega}{2v}}} - e^{-h\sqrt{\frac{\omega}{2v}}}\right)\cos\left(h\sqrt{\frac{\omega}{2v}}\right) +$$
$$j\left(e^{h\sqrt{\frac{\omega}{2v}}} + e^{-h\sqrt{\frac{\omega}{2v}}}\right)\sin\left(h\sqrt{\frac{\omega}{2v}}\right) \quad (5)$$

In some embodiments, for instance for the sake of simplicity, the constants can be defined as:

$$\boxed{\begin{aligned} A &= e^{h\sqrt{\frac{\omega}{2v}}} + e^{-h\sqrt{\frac{\omega}{2v}}} \\ B &= e^{h\sqrt{\frac{\omega}{2v}}} - e^{-h\sqrt{\frac{\omega}{2v}}} \end{aligned}}$$

$$e^{h^*} + e^{-h^*} = A\cos\left(h\sqrt{\frac{\omega}{2v}}\right) + jB\sin\left(h\sqrt{\frac{\omega}{2v}}\right)$$

$$e^{h^*} - e^{-h^*} = B\cos\left(h\sqrt{\frac{\omega}{2v}}\right) + jA\sin\left(h\sqrt{\frac{\omega}{2v}}\right)$$

$$\frac{\partial\left(\frac{\tau_w}{U}\right)}{\partial h} = \frac{\mu j\omega}{v}\frac{2(e^{h^*} + e^{-h^*})}{(e^{h^*} - e^{-h^*})^2}$$

$$\frac{\partial\left(\frac{\tau_w}{U}\right)}{\partial h} = \frac{2\mu j\omega}{v}\frac{A\cos\left(h\sqrt{\frac{\omega}{2v}}\right) + jB\sin\left(h\sqrt{\frac{\omega}{2v}}\right)}{\left(B\cos\left(h\sqrt{\frac{\omega}{2v}}\right) + jA\sin\left(h\sqrt{\frac{\omega}{2v}}\right)\right)^2}$$

$$\frac{\partial\left(\frac{\tau_w}{U}\right)}{\partial h} =$$

$$\frac{2\mu j\omega}{v}\frac{A\cos\left(h\sqrt{\frac{\omega}{2v}}\right) + jB\sin\left(h\sqrt{\frac{\omega}{2v}}\right)}{B^2\cos^2\left(h\sqrt{\frac{\omega}{2v}}\right) + 2jAB\cos\left(h\sqrt{\frac{\omega}{2v}}\right)\sin\left(h\sqrt{\frac{\omega}{2v}}\right) - A^2\sin^2\left(h\sqrt{\frac{\omega}{2v}}\right)}$$

$$\frac{\partial\left(\frac{\tau_w}{U}\right)}{\partial h} = \frac{2\mu j\omega}{v}\frac{A\cos\left(h\sqrt{\frac{\omega}{2v}}\right) + jB\sin\left(h\sqrt{\frac{\omega}{2v}}\right)}{B^2\cos^2\left(h\sqrt{\frac{\omega}{2v}}\right) - A^2\sin^2\left(h\sqrt{\frac{\omega}{2v}}\right) + 2jAB\cos\left(h\sqrt{\frac{\omega}{2v}}\right)\sin\left(h\sqrt{\frac{\omega}{2v}}\right)}$$

$$\frac{\partial\left(\frac{\tau_w}{U}\right)}{\partial h} = \frac{2\mu j\omega}{v}\frac{A\cos\left(h\sqrt{\frac{\omega}{2v}}\right) + jB\sin\left(h\sqrt{\frac{\omega}{2v}}\right)}{\text{Re}(D) + j\text{Im}(D)}$$

In this new expression, D can be the denominator of the previous equation (for simplicity). In some embodiments, Re may denote the "real part of" the quantity within parentheses.

In some embodiments, to get all imaginary constants to the numerator, the complex conjugate of the new denominator is multiplied throughout, yielding:

$$\frac{\partial\left(\frac{\tau_w}{U}\right)}{\partial h} = \frac{2\mu j\omega}{v}\frac{\left(A\cos\left(h\sqrt{\frac{\omega}{2v}}\right) + jB\sin\left(h\sqrt{\frac{\omega}{2v}}\right)\right)(\text{Re}(D) - j\text{Im}(D))}{\text{Re}^2(D) + \text{Im}^2(D)}$$

$$= \frac{2\mu j\omega}{v(\text{Re}^2(D) + \text{Im}^2(D))}\left(A\cos\left(h\sqrt{\frac{\omega}{2v}}\right)\right.$$
$$\text{Re}(D) + B\sin\left(h\sqrt{\frac{\omega}{2v}}\right)\text{Im}(D) + j\left(B\sin\left(h\sqrt{\frac{\omega}{2v}}\right)\text{Re}(D) - \right.$$
$$\left.A\cos\left(h\sqrt{\frac{\omega}{2v}}\right)\text{Im}(D)\right)$$
$$= \frac{2\mu\omega}{v(\text{Re}^2(D) + \text{Im}^2(D))}\left(j\left(A\cos\left(h\sqrt{\frac{\omega}{2v}}\right)\text{Re}(D) + B\sin\right.\right.$$
$$\left(h\sqrt{\frac{\omega}{2v}}\right)\text{Im}(D)\right) - \left(B\sin\left(h\sqrt{\frac{\omega}{2v}}\right)\text{Re}(D) - A\cos$$
$$\left.\left(h\sqrt{\frac{\omega}{2v}}\right)\text{Im}(D)\right)\right)$$

In some embodiments, an important part of this expression can be the imaginary component since that is how the velocity field was initially defined. As such, the expression can be expressed such as in equation (9):

$$\text{Im}\left(\frac{\partial\left(\frac{\tau_w}{U}\right)}{\partial h}\right) = \quad (9)$$
$$\frac{2\mu\omega}{v(\text{Re}^2(D) + \text{Im}^2(D))}\left(A\cos\left(h\sqrt{\frac{\omega}{2v}}\right)\text{Re}(D) + B\sin\left(h\sqrt{\frac{\omega}{2v}}\right)\text{Im}(D)\right)$$

In some embodiments, such as described elsewhere herein, the original denominator, D, can be expressed as or determined based upon:

$$D = B^2\cos^2\left(h\sqrt{\frac{\omega}{2v}}\right) - A^2\sin^2\left(h\sqrt{\frac{\omega}{2v}}\right) + 2jAB\cos\left(h\sqrt{\frac{\omega}{2v}}\right)\sin\left(h\sqrt{\frac{\omega}{2v}}\right)$$

In some embodiments, to find the height that yields the maximum wall shear stress, the imaginary component shown in equation (9) may or should equal zero, which may mean that the numerator of equation (9) may or should be zero, which may result in the expressions below:

$$A\cos\left(h\sqrt{\frac{\omega}{2v}}\right)\text{Re}(D) + B\sin\left(h\sqrt{\frac{\omega}{2v}}\right)\text{Im}(D) = 0$$

$$A\cos(H)(B^2\cos^2(H) - A^2\sin^2(H)) + B\sin(H)(2AB\cos(H)\sin(H)) = 0$$

$$AB^2\cos^3(H) - A^3\cos(H)\sin^2(H) + 2AB^2\cos(H)\sin^2(H) = 0$$

$$A\cos^3(H)(B^2 - A^2\tan^2(H) + 2B^2\tan^2(H)) = 0$$

In some embodiments, variable H is being used to simplify the expression, where $$H = h\sqrt{\frac{\omega}{2v}}.$$

As used here, H is different than the earlier variable h*, which included the imaginary number in it.

In some embodiments, using the zero-product property, this expression may be true for at least the following two cases:

$$A \cos^3(H) = 0$$

$$B^2 - A^2 \tan^2(H) + 2B^2 \tan^2(H) = 0$$

In some embodiments, the second case may not have a solution, however the first case may be solved as:

$$H = \frac{(2n+1)\pi}{2} n = 0, 1, 2, \ldots$$

In some embodiments, such as using such a definition of H, the height that allows for maximum shear stress may be found according to:

$$h = \sqrt{\frac{2\nu}{\omega}} \frac{(2n+1)\pi}{2} n = 0, 1, 2, \ldots$$

In some embodiments, the case of n=0 may be the physically realizable case associated with the maximum wall shear stress. Using such expressions and the maximum wall shear stress information associated, the optimized height for maximum wall shear stress and the corresponding wall shear stress value can be plotted versus frequency such as in FIG. 8. As illustrated in FIG. 8, for a given frequency, the optimal sensor height and corresponding maximum normalized wall shear stress are shown. In some embodiments, other plots may result based on a fixed sensor location instead, where a normalized wall shear stress is found based on a frequency at a given height.

In some embodiments, the sensor location can be on the order of hundreds of micrometers for nearly all frequencies up to or greater than about 2,000 Hz. According to some embodiments, this may be feasible for all frequencies. Additionally, in some embodiments, the corresponding normalized wall shear stress can be on the order of tens or hundreds of mPa.

Discussed below is one possible implementation of the calibration approach and expressions disclosed herein. The device, methods, approaches, and the like disclosed below detail one possible design for accomplishing the calibration procedures disclosed herein. As such, other possible designs, devices, approaches, methods and the like for implementing the calibration approach disclosed herein are also contemplated and are within the scope of this disclosure.

Referring now to FIGS. 9 and 10, different views of an example calibration system for oscillating plate calibration are shown. Such a system may include an electrodynamic shaker (or any device that produces suitable oscillations), labeled as A. In some embodiments, the electrodynamic shaker A can be attached to a plate B. In some embodiments, this plate can be a portion of the system that is generating the wall shear stress. In some embodiments, the plate may remain level due to its positioning on a set of loose ball bearings C, or other suitable leveling means, that are resting in a base D. In some embodiments, the "oscillating plate" portion of the system can therefore comprise the electrodynamic shaker A, the plate B, the loose ball bearings C, and the base D.

In some embodiments, a second portion of the system can be used to position the sensor at a known location above the plate B. In some embodiments, Part E can be or comprise a structure that features a threaded hole, such that a threaded, cylindrical rod F is able to move up and down in at least a component of part E. In some embodiments, moving up and down with F is a connecting structure H that joins the movable rod to an annular cylinder I that houses a wall shear stressing device. In some embodiments, to ensure that the connecting structure H doesn't rotate with the threaded rod F, a threaded collar G can be positioned between the two.

One possible embodiment of a wall shear stress sensing and calibration system can comprise:

an actuator A, such as horizontal shakers and other electrodynamic devices that provide horizontal displacement at a supplied frequency and amplitude, typically specified by an external source, e.g., waveform generator;

an oscillating plate B connected to the actuator A, the oscillating plate configured to move back and forth at a specified frequency;

one or more ball bearings C, that may allow the oscillating plate B to remain level with minimal contact area to minimize friction;

a ball bearing base D that is machined to hold the loose ball bearings C in place relative to the oscillating plate B;

a height control base E comprising a threaded structure that supports a threaded rod F and allows for a sensor position to be maintained;

the height control rod F comprising a threaded rod that can be screwed into the height control base E to determine the sensor position above the one or more ball bearings C;

a threaded bearing G that is threaded so the height control rod F can be twisted without affecting the position of a connector H;

the connector H configured to connect the threaded rod F to a sensor holder I;

the sensor holder I may comprise an annular rod that holds a cylindrical, tubing that houses the wall shear stress sensor; and one or more proximity sensors J supported on prongs extending from the sensor holder I, the proximity sensors comprising, e.g., Hall Effect sensors, laser-based devices, etc., where having multiple sensors can confirm that the sensor position relative to the oscillating plate is constant, e.g., the oscillating plate B is flat.

In some embodiments, to determine the position of the sensor J above the oscillating plate B, proximity sensors are located at J. As shown in the isometric view in FIG. 10, there are multiple proximity sensors to ensure that the position of the sensor is constant, e.g., such that the oscillating plate B and the sensor holder I are substantially or sufficiently parallel or otherwise aligned with respect to one another.

In some embodiments, a method for calibration, such as for calibration of the sensor of the system described above can be carried out as follows. In some embodiments, a waveform generator can be caused to supply the actuator A with an electrical signal to cause oscillations of the oscillating plate B at a certain frequency and amplitude. In some embodiments, the velocity of the actuator A/oscillating plate B (e.g., needed to find the actual wall shear stress as in FIGS. 7 and 8) is computed based on specifications in a data sheet or otherwise supplied. In some embodiments, at some specified frequencies, wall shear stress values were found in conjunction with the specified height (e.g., determined by the proximity sensors and altered by screwing the threaded rod up or down). In some embodiments, according to the approaches disclosed herein, multiple heights can be tested for a given frequency (e.g., based on a plot as illustrated in FIG. 7) and a linear fit of the voltage response can be determined, resulting in a sensitivity value. This can be accomplished at multiple frequencies.

As discussed herein, the accurate calibration of wall shear stress sensors is crucial towards understanding flow phenomena. Previous calibrations are only valid for a limited number of frequencies and may present inaccuracies in the measured wall shear stress. As disclosed herein, one possible calibration approach and system for implementation of the calibration approach are discussed that solve the problems associated with prior calibration procedures. Although not illustrated as such, the methods and techniques disclosed herein may be used in a reciprocity situation, e.g., for a system having, instead of an oscillating plate, a second wall shear stress sensor as an actuator. In other words, for such a system an electrical source may cause the floating element of the second sensor to oscillate, similar to the oscillation of the first (aforementioned) oscillating plate. Since the input of the second sensor is known and the response of the first sensor is determined, the two sensitivities may ultimately be found and compared to aid in calibration of the sensor.

Referring now to FIG. 11, a flow diagram is provided that illustrates an example method for calibration of a wall shear stress sensor 10, that comprises providing one or more sensors a height above an oscillating plate, the oscillating plate being disposed on a reduced friction sliding device and coupled to an actuator, the actuator being configured to cause the oscillating plate to oscillate relative to the one or more sensors, at 11. The method 10 can further comprise causing the actuator to oscillate the oscillating plate at a frequency sufficient to generate a velocity field towards the one or more sensors, at 12. The method 10 can further comprise sensing, using the one or more sensors, shear stress at a wall, the shear stress at the wall being associated with the velocity field, at 13. The method 10 can further comprise determining a theoretical wall shear stress based on the velocity field, fluid properties, the frequency at which the oscillating plate is oscillating, and the height of the one or more sensors above the oscillating plate, at 14. Said otherwise, in some embodiments, the sensors can produce an output, e.g., a voltage output; based on the equations presented hereinabove, the theoretical wall shear is predicted and then compared to the experimental electrical output; this comparison can facilitate calibration of the sensors. In some embodiments, some or all elements of the method 10 can be carried out using a computing device or similar circuitry and a calibration system, such as that illustrated in FIGS. 9 and 10. In some embodiments, the fluid properties can comprise fluid temperature. In some embodiments, the one or more sensors are coupled to a sensor holder and supported on a connector, the connector being configured to be moveably coupled to a height control rod supported on a height control base. In some embodiments, the sensor holder comprises an annular rod that holds a cylindrical tubing configured to house the one or more sensors. In some embodiments, at least one proximity sensor can be supported on at least one of the one or more prongs extending from the sensor holder. In some embodiments, the actuator comprises one or more of a horizontal shaker, a waveform generator, a horizontal displacement device, and an electrodynamic device. In some embodiments, the one or more sensors can be configured to confirm that a sensor position relative to a position of the oscillating plate is constant during use of the wall shear stress sensor.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." Any ranges cited herein are inclusive.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the terms "about," "approximately," and "substantially" when used in connection with a numerical value generally means plus or minus 10% of the value stated, e.g., about 5 would include 4.5 to 5.5, about 10 would include 9 to 11, and about 100 would include 90 to 110.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A system for calibrating a wall shear stress sensor, the system comprising:
   an oscillating plate coupled to an actuator and mounted on a reduced friction sliding device, wherein the oscillating plate is configured to generate a velocity field transmitted towards the one or more sensors; and
   one or more sensors disposed a distance above the oscillating plate, at least one of the oscillating plate and the one or more sensors configured to be moveable to achieve the distance of the one or more sensors above the oscillating plate, the one or more sensors being configured to measure shear stress at a wall, the shear stress at the wall being associated with the velocity field.

2. The system of claim 1, further comprising:
   a height control rod coupled to a height control base; and
   a sensor holder configured to house the one or more sensors and supported on a connector, the connector configured to be rotatably disposed about the height control rod.

3. The system of claim 2, wherein the sensor holder comprises an annular rod that holds a cylindrical tubing configured to house the one or more sensors.

4. The system of claim 2, further comprising:
   at least one proximity sensor supported on one or more prongs extending from the sensor holder.

5. The system of claim 1, wherein the actuator comprises one or more of a horizontal shaker, a waveform generator, a horizontal displacement device, and an electrodynamic device.

6. The system of claim 1, wherein the one or more sensors are configured to confirm that a sensor position relative to a position of the oscillating plate is constant during use of the system.

7. The system of claim 1, wherein the one or more sensors are configured to be calibrated using the system by at least:
   causing the actuator to oscillate the oscillating plate at a frequency sufficient to generate the velocity field;
   sensing, using the one or more sensors, the shear stress at the wall, the shear stress at the wall being associated with the velocity field; and
   determining a theoretical wall shear stress based on the velocity field, fluid properties, the frequency of oscillation of the oscillating plate, and the height of the one or more sensors above the oscillating plate.

8. The system of claim 7, wherein the fluid properties comprises fluid temperature.

9. A method comprising:
   providing one or more sensors a height above an oscillating plate, the oscillating plate being disposed on a reduced friction sliding device and coupled to an actuator, the actuator being configured to cause the oscillating plate to oscillate relative to the one or more sensors;
   causing the actuator to oscillate the oscillating plate at a frequency sufficient to generate a velocity field towards the one or more sensors;
   sensing, using the one or more sensors, shear stress at a wall, the shear stress at the wall being associated with the velocity field; and
   determining a theoretical wall shear stress based on the velocity field, fluid properties, the frequency at which the oscillating plate is oscillating, and the height of the one or more sensors above the oscillating plate.

10. The method of claim 9, wherein the fluid properties comprise fluid temperature.

11. The method of claim 9, wherein the one or more sensors are coupled to a sensor holder and supported on a connector, the connector being configured to be moveably coupled to a height control rod supported on a height control base.

12. The method of claim 11, wherein the sensor holder comprises an annular rod that holds a cylindrical tubing configured to house the one or more sensors.

13. The method of claim 11, wherein at least one proximity sensor is supported on one or more prongs extending from the sensor holder.

14. The method of claim 9, wherein the actuator comprises one or more of a horizontal shaker, a waveform generator, a horizontal displacement device, and an electrodynamic device.

15. The method of claim 9, wherein the one or more sensors are configured to confirm that a sensor position relative to a position of the oscillating plate is constant during use of the wall shear stress sensor.

16. A method comprising:
  causing oscillation of an oscillating plate at a frequency and an amplitude, the oscillating plate being disposed a relative vertical distance from one or more sensors, wherein oscillating the oscillating plate at the frequency and the amplitude is sufficient to generate a velocity field that is transmitted towards the one or more sensors;
  sensing, using the one or more sensors, shear stress at a wall, the shear stress at the wall being associated with the velocity field; and
  determining a theoretical wall shear stress based on the velocity field, the frequency and amplitude of oscillation of the oscillating plate, and the relative distance of the one or more sensors from the oscillating plate.

17. The method of claim 16, further comprising:
  moving one or more of the oscillating plate and the one or more sensors to achieve one or more adjusted relative distances between the oscillating plate and the one or more sensors such that the oscillating plate is caused to generate one or more adjusted velocity fields when oscillating at the frequency;
  sensing, using the one or more sensors, the shear stress at the wall, the shear stress at the wall being associated with the one or more adjusted velocity fields;
  determining a line of best fit through the velocity field and the one or more adjusted velocity fields; and
  determining an adjusted theoretical wall shear stress based on the velocity field, the one or more adjusted velocity fields, the frequency and amplitude of oscillation of the oscillating plate, the relative distance of the one or more sensors from the oscillating plate, the one or more adjusted relative distances of the one or more sensors from the oscillating plate, and the line of best fit through the velocity field and the one or more adjusted velocity fields.

18. The method of claim 16, further comprising:
  oscillating the oscillating plate at one or more adjusted frequencies and one or more adjusted amplitudes such that the oscillating plate is caused to generate one or more adjusted velocity fields when the one or more sensors are disposed the relative distance from the oscillating plate;
  sensing, using the one or more sensors, the shear stress at the wall, the shear stress at the wall being associated with the one or more adjusted velocity fields;
  determining a line of best fit through the velocity field and the one or more adjusted velocity fields; and
  determining an adjusted theoretical wall shear stress based on the velocity field, the one or more adjusted velocity fields, the frequency and amplitude of oscillation of the oscillating plate, the one or more adjusted frequencies of oscillation of the oscillating plate, the one or more adjusted amplitudes of oscillation of the oscillating plate, the relative distance of the one or more sensors from the oscillating plate, and the line of best fit through the velocity field and the one or more adjusted velocity fields.

19. The method of claim 16, further comprising:
  determining one or more fluid properties of a fluid disposed between the oscillating plate and the one or more sensors; and
  determining the theoretical wall shear stress based on the velocity field, the frequency and amplitude of oscillation of the oscillating plate, the relative distance of the one or more sensors from the oscillating plate, and the one or more fluid properties of the fluid disposed between the oscillating plate and the one or more sensors.

20. The method of claim 19, wherein the one or more fluid properties comprise temperature, and the fluid comprises air.

* * * * *